Nov. 17, 1936.　　　O. J. CROWE　　　2,060,976
MOLDING FOR AUTOMOBILE ROOFS AND MEANS FOR SECURING SAME
Filed Oct. 26, 1932
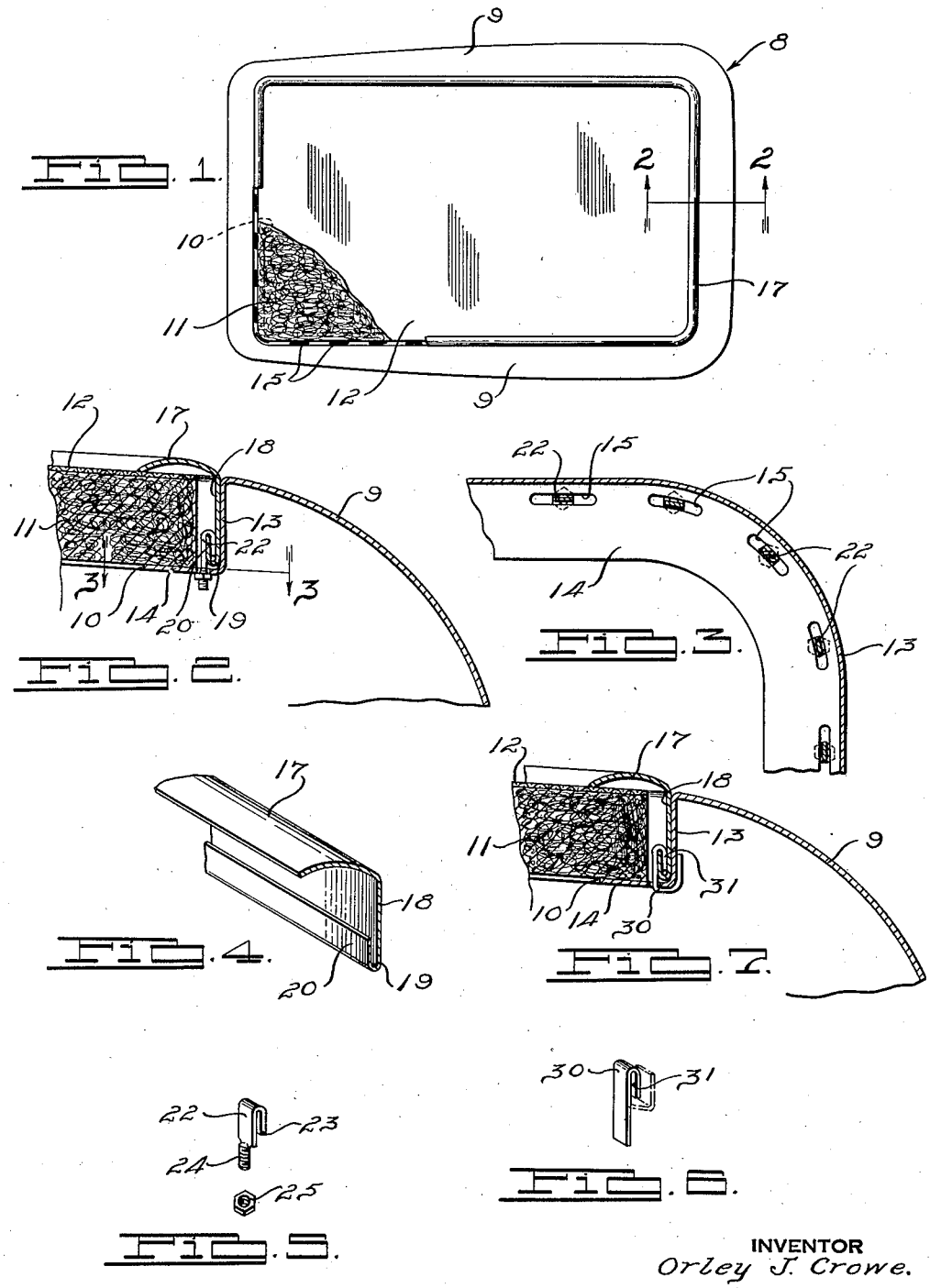
INVENTOR
Orley J. Crowe.
BY
Harness, Dickey, Pierce & Hann
ATTORNEYS.

Patented Nov. 17, 1936

2,060,976

UNITED STATES PATENT OFFICE 2,060,976

MOLDING FOR AUTOMOBILE ROOFS AND MEANS FOR SECURING SAME

Orley J. Crowe, Detroit, Mich., assignor to Herron-Zimmers Moulding Company, a corporation of Illinois Application October 26, 1932, Serial No. 639,652

5 Claims. (Cl. 296—137)

My invention relates to molding for automobile roofs and the method of securing the molding and roof in position.

In the manufacture of automobile bodies and the like, rigid roof panels of fiber or other similar material are sometimes employed which are mounted in a central roof opening surrounded by the roof quarter panels. Means is necessary to retain the roof panel in position and to insulate the joint in a waterproof manner from the effects of weather, water, or cold air, for example. My invention has to do with improvements in such means.

It is an object of my invention to provide an improved roof molding and method of securing the molding to the roof, which is economical to manufacture, easy to install, requiring very little time and effort to assemble in position, and which is efficient in use.

Many other objects and advantages of my invention will readily become apparent throughout a reading of the following detailed description and accompanying drawing, in which:—

Figure 1 is a plan view of the roof of an automobile body illustrating an application of the molding of my invention, parts being broken away to illustrate certain details more clearly.

Figure 2 is an enlarged cross-sectional view taken on the line 2—2 of Figure 1.

Figure 3 is a cross-sectional view taken on the line 3—3 of Figure 2, looking in the direction indicated by the arrows.

Figure 4 is an enlarged perspective detail view of a section of the improved molding of my invention.

Figure 5 is an enlarged perspective detail view of one type of fastening device of my invention, such as is used in the assembly shown in Figure 2.

Figure 6 is an enlarged perspective detail view of a modified form of fastening device of my invention, and Figure 7 is an enlarged cross sectional view similar to Figure 2 illustrating an application of the modified form of fastening device illustrated in Figure 6.

Referring now to the drawing in which like reference characters designate like parts throughout the several views, I have shown in Figure 1 an automobile body 8 having the usual roof quarter panels 9 which define a roof opening 10. A roof panel 11 of fiber or other suitable material is adapted to fit within the opening 10 and the upper surface of this fiber roof panel 11 is generally covered with a waterproof fabric or imitation leather covering 12. The roof quarter panels 9 which define the opening 10 are bent downwardly at 13, as shown in Figure 2, and are turned inwardly to form a flange 14 upon which the fiber roof panel rests. The flange 14 extends along all sides of the roof opening.

The flange 14 is provided with a plurality of spaced slots 15, as best shown in Figure 3, which are formed adjacent the downwardly extending portion 13 of the panel 9 and are spaced substantially equi-distant entirely around the flange 14 which surrounds the roof opening 10. These slots are for the purpose of receiving fastening devices and will be hereinafter described.

A section of the improved molding of my invention is illustrated in Figure 4 and comprises an arcuate lip portion 17 adapted to extend over the marginal edges of the roof panel 11. A vertically extending portion 18 extends downwardly from the lip 17 and is folded reversely upon itself at its lower edge to form an open U-shaped groove 19 and the lower edge taking the form of an upstanding flange 20 which defines the inner side of the groove 19.

The portion 18 of the molding is adapted to be disposed adjacent the vertically extending portion 13 of the panel 9 as illustrated in Figure 2 and the folded end of the molding is adapted to be disposed above the flange 14, with the lip 17 extending over the marginal edge of the roof panel. The upstanding flange 20, which is folded at the lower edge of the molding, extends throughout the entire length of the molding to form a continuous U-shaped groove 19 entirely around the roof opening.

In Figure 5, I have illustrated one form of fastening device which may be used to retain the roof molding in assembled position. This device comprises a flat metal clip 22, the upper end of which is reverted upon itself to form a flat hook 23 adapted to be received in the groove 19 of the molding in interlocking relation therewith, as illustrated in Fig. 2. The lower portion of the clip 22 is rounded at 24 and screw threaded to form a bolt which is adapted to receive a nut 25 for drawing the clip 22 snugly down into position. The bolt end 24 of these fastening devices is adapted to extend through the slots 15 in the flange 14, and it is to be here noted that the slots are disposed in the flange 14 inwardly from the portion 13 thereof a sufficient distance to bring the fastening devices 22 in proper alignment with the grooved portion 19 of the lower edge of the molding.

It will be apparent that the molding 17 may be quickly installed by inserting the folded edge portion 20 and upstanding portion 18 between the outer edge of the roof panel 11 and the vertical portion 13 of the quarter panel with the lip 17 covering the marginal edge of the roof and extending some distance inwardly thereof.

The fastening devices 22 may be readily inserted upwardly through the slots 15 and the hook portions 23 placed in interlocking engagement with the upstanding flange 20 of the molding and the groove 19 thereof and nuts 25 may then be screw-threaded on the lower bolt ends 24 of the fastening devices to draw the molding down tightly in position.

In Figures 6 and 7, I have illustrated a modified form of fastening device of my invention. This form of fastening device constitutes a deformable flat metal clip 30, one end of which is folded over, as illustrated in Fig. 6, to form a hook 31 in the same manner as the hook is formed in the fastening device illustrated in Figure 5 and previously described. This deformable clip is adapted to be inserted through the slots 15 of the flange 14 and to be hooked over the upstanding flange 20 of the molding member, as illustrated in Figure 7 for the purpose of holding the molding down in assembled position. The device is then deformed by bending as illustrated by the dotted lines in Figure 6, and as shown in Fig. 7 to retain the parts in position. It is understood that the clip may be deformed by folding in either direction.

The molding of my invention may be readily applied with very little time and effort, and provides a weather tight and completely finished joint. Due to the continuous groove 19 and upstanding flange 20 formed in the lower edge of the molding which extends entirely around the roof opening, it is not necessary to "spot" or accurately locate and align the cooperating parts of the molding and fastening devices since the hook of the fastening device will always be in position to engage the groove and flange regardless of which slot 15 the device is fastened in. The one-piece molding is economical to manufacture and easy to apply by the use of either form of fastening device described.

I claim:

1. The combination of a molding for an automobile roof and means to secure the molding in position comprising a flange member extending inwardly of the roof quarter panels to define a roof opening, said flange having a plurality of slots extending therethrough, a roof panel adapted to fill said opening, the edges of which panel being supported by said flange, a molding having a projecting lip extending inwardly over the marginal edge of the roof panel, and having a downwardly extending portion, the lower edge of which is folded to form a continuous groove, a plurality of hook shaped fastening devices extending upwardly through the slots in the flange member, and engaging the groove of the molding in interlocking relation therewith, and means to secure said fastening devices in fixed position on the underside of the flange member.

2. The combination of a molding for an automobile roof, and means to secure the molding in position comprising a flange member extending inwardly of the roof quarter panels defining a roof opening, said flange having a plurality of slots extending therethrough, a roof panel adapted to fill said opening, the edges of which panel are supported by said flange, a molding having a projecting lip extending inwardly over the marginal edge of the roof panel and having a downwardly extending portion covering the outer marginal edge of the roof panel, an upstanding flange formed in the lower marginal edge of the molding, a plurality of hook shaped fastening devices adapted to be inserted and to extend through the slots in the flange member, the hook portions of said fastening devices being in interlocking engagement with the upstanding flange of the molding, and the lower end of said hook portion extending downwardly through the slot in the flange, and means to secure the fastening devices in fixed interlocking relation with the molding and flange member.

3. The combination of a molding for an automobile roof, and means to secure the molding in position comprising a flange member extending inwardly of the roof quarter panels defining a roof opening, said flange having a plurality of slots extending therethrough, a roof panel adapted to fill said opening, the edges of which panel are supported by said flange, a molding having a projecting lip extending inwardly over the marginal edge of the roof panel and having a downwardly extending portion covering the outer marginal edge of the roof panel, an upstanding flange formed in the lower marginal edge of the molding, a plurality of hook fastening devices in interlocking engagement with the upstanding flange of the molding, the lower ends of said fastening devices being screw threaded to form a bolt and extending downwardly through the slots in the flange member, and nuts screw threaded on the ends of said bolts on the underside of said flange member adapted to draw the fastening devices downwardly in tight interlocking connection with the molding.

4. The combination of a molding for an automobile roof, and means to secure the molding in position comprising a flange member extending inwardly of the roof quarter panels defining a roof opening, said flange having a plurality of slots extending therethrough, a roof panel adapted to fill said opening, the edges of which panel are supported by said flange, a molding having a projecting lip extending inwardly over the marginal edge and upper surface of the roof panel and having a downwardly extending portion covering the outer marginal edge of the roof panel, an upstanding flange formed in the lower marginal edge of the molding, a plurality of deformable hook shaped fastening devices, the hooked ends of which are disposed in interlocking relation with the upstanding flange of the molding, and the lower ends of which extend downwardly through the slots of the flange member and are deformed on the underside of the flange member to fix the fastening devices in interlocking connection with the molding and to retain the molding in position.

5. The combination of a molding for an automobile roof and means to secure the molding in position, comprising a roof opening defined by surrounding roof quarter panels, the inner edges of said quarter panels being extending downwardly to form an upstanding portion, and inwardly to form a flange surrounding the roof opening, said flange having a plurality of slots extending therethrough, a roof panel of substantial thickness adapted to fill said opening, the edges of which panel are supported by said flange in spaced relation from the upstanding portion of the roof quarter panels, a molding having an arcuate projecting lip extending inwardly over the upper surface and marginal edge of the roof panel and having a downwardly extending portion covering the outer edge of the roof panel and engaging the inner surface of the upstanding portion of the roof quarter panel, the lower edge of said molding being folded to form a continuous upstanding flange, a plurality of hook shaped fastening devices in interlocking engagement with the upstanding flange of the lower edge of the molding, said fastening devices extending downwardly through the slots and the flange member, and means to secure said fastening devices in fixed position on the underside of the flange member.

ORLEY J. CROWE.